US009746571B2

(12) United States Patent
Juan et al.

(10) Patent No.: US 9,746,571 B2
(45) Date of Patent: Aug. 29, 2017

(54) PROXIMITY SENSOR ANTENNA DEVICE AND ANTENNA STRUCTURE THEREOF

(71) Applicant: AUDEN TECHNO CORP., Taoyuan County (TW)

(72) Inventors: Peng-Hao Juan, Taipei (TW); Yu-Tsung Huang, Kaohsiung (TW)

(73) Assignee: AUDEN TECHNO CORP., Taoyuan County (TW)

(*) Notice: Subject to any disclaimer, the term of this patent is extended or adjusted under 35 U.S.C. 154(b) by 47 days.

(21) Appl. No.: 14/959,352

(22) Filed: Dec. 4, 2015

(65) Prior Publication Data

US 2017/0160416 A1 Jun. 8, 2017

(51) Int. Cl.

| | |
|---|---|
| ***H01Q 1/44*** | (2006.01) |
| ***G01V 3/08*** | (2006.01) |
| ***H01Q 1/38*** | (2006.01) |
| ***H01Q 1/24*** | (2006.01) |
| ***H01Q 5/378*** | (2015.01) |
| ***H01Q 5/328*** | (2015.01) |
| ***H01Q 9/42*** | (2006.01) |

(52) U.S. Cl.

CPC ............... *G01V 3/08* (2013.01); *H01Q 1/243* (2013.01); *H01Q 1/38* (2013.01); *H01Q 5/328* (2015.01); *H01Q 5/378* (2015.01); *H01Q 9/42* (2013.01)

(58) Field of Classification Search

CPC .......... H01Q 1/243; H01Q 1/44; H01Q 5/328; H01Q 5/378; H01Q 9/42

See application file for complete search history.

(56) References Cited

U.S. PATENT DOCUMENTS

| | | | | |
|---|---|---|---|---|
| 9,478,870 | B2 * | 10/2016 | Desclos | H01Q 1/243 |
| 9,502,768 | B2 * | 11/2016 | Huang | H01Q 1/002 |
| 2015/0022403 | A1 * | 1/2015 | Lin | H01Q 1/44 343/702 |
| 2015/0200447 | A1 * | 7/2015 | Tang | H01Q 1/243 343/720 |
| 2016/0087343 | A1 * | 3/2016 | Chang | H01Q 1/245 343/720 |

* cited by examiner

*Primary Examiner* — Hoang Nguyen

(74) *Attorney, Agent, or Firm* — Li & Cai Intellectual Property (USA) Office

(57) ABSTRACT

A P-sensor device includes an antenna structure and a P-sensor module. The antenna structure includes a first conductor, a second conductor, a capacitance member, and an inductance member. The capacitance member and inductance member are electrically connected to the second conductor. When the second conductor is in a capacitance electrode mode, a capacitance value between the second conductor and an external object is variable, and the capacitance member is configured to block a detecting signal, which travels in the second conductor. When the second conductor is in a coupling antenna mode, the inductance member is configured to block a RF signal, which travels in the second conductor. The P-sensor module is electrically connected to the inductance member and is electrically connected to the second conductor via the inductance member.

6 Claims, 3 Drawing Sheets

PROXIMITY SENSOR ANTENNA DEVICE AND ANTENNA STRUCTURE THEREOF

BACKGROUND OF THE INVENTION

1. Field of the Invention

The instant invention relates to an antenna device; in particular, to a proximity sensor antenna device and an antenna structure thereof.

2. Description of Related Art

For controlling a magnitude of radiation generated by a hand-held electronic device to an user, a proximity sensor (i.e., P-sensor) is added on an antenna, which is applied to wireless wide area network (WWAN), in a hand-held electronic device for detecting a distance between the user and the antenna, such that a protection mechanism can be started by using the P-sensor to reduce radiation of the antenna, thereby reducing the magnitude of radiation generated by the hand-held electronic device to the user. However, a conventional antenna device is provided with a complex construction for having a detecting function, such as a plurality of P-sensors or a plurality of capacitance members respectively cooperated with a plurality of conductive layers.

SUMMARY OF THE INVENTION

The instant disclosure provides a proximity sensor antenna device and an antenna structure thereof for effectively improving the problem generated by the conventional antenna device.

The instant disclosure provides a proximity sensor antenna device, comprising: an antenna structure, comprising: a first conductor having a feeding segment for receiving a signal and a radiating segment connected to the feeding segment; a second conductor having a grounding segment for electrically connecting to a ground and a detecting segment connected to the grounding segment, wherein the second conductor and the first conductor are in a coplanar arrangement and are separated from each other, wherein the detecting segment is selectively in a coupling antenna mode and in a capacitance electrode mode; when the detecting segment is in the coupling antenna mode, the detecting segment is configured to couple with the radiating segment through a radiofrequency signal; when the detecting segment is in the capacitance electrode mode, the detecting segment is configured to detect an external object, and a capacitance value between the detecting segment and the external object is variable according to a distance between the detecting segment and the external object; a capacitance member electrically connected to the grounding segment of the second conductor, wherein the capacitance member is configured to block a detecting signal traveling in the detecting segment when the detecting segment is in the capacitance electrode mode; and an inductance member electrically connected to the second conductor, wherein the inductance member is configured to block a radiofrequency signal traveling in the detecting segment when the detecting segment is in the coupling antenna mode; and a proximity sensor module electrically connected to the inductance member and electrically connected to the second conductor via the inductance member, wherein when the proximity sensor module emits a detecting signal into the inductance member, the inductance member is in a short-circuit mode for providing a traveling path of the detecting signal, and the capacitance member is in an open-circuit mode for guiding the detecting signal to flow into the detecting segment of the second conductor, wherein when the first conductor and the second conductor are coupled through a radiofrequency signal and the radiofrequency signal flows into the inductance member, the inductance member is in an open-circuit mode for preventing the radiofrequency signal from flowing into the proximity sensor module, and the capacitance member is in a short-circuit mode for providing a traveling path of the radiofrequency signal.

The instant disclosure also provides an antenna structure of a proximity sensor antenna device, comprising: a first conductor having a feeding segment for receiving a signal and a radiating segment connected to the feeding segment; a second conductor having a grounding segment for electrically connecting to a ground and a detecting segment connected to the grounding segment, wherein the second conductor and the first conductor are in a coplanar arrangement and are separated from each other, wherein the detecting segment is selectively in a coupling antenna mode and in a capacitance electrode mode; when the detecting segment is in the coupling antenna mode, the detecting segment is configured to couple with the radiating segment through a radiofrequency signal; when the detecting segment is in the capacitance electrode mode, the detecting segment is configured to detect an external object, and a capacitance value between the detecting segment and the external object is variable according to a distance between the detecting segment and the external object; a capacitance member electrically connected to the grounding segment of the second conductor, wherein the capacitance member is configured to block a detecting signal traveling in the detecting segment when the detecting segment is in the capacitance electrode mode; and an inductance member electrically connected to the second conductor, wherein the inductance member is configured to block a radiofrequency signal traveling in the detecting segment when the detecting segment is in the coupling antenna mode.

In summary, the P-sensor antenna device and the antenna structure in the instant disclosure are provided to reduce volume and cost by having the above component arrangement and using the second conductor to selectively be a radiator and a capacitance electrode. Moreover, the first and second conductors are in a coplanar arrangement and are separated from each other, and the capacitance member and the inductance member are electrically connected to the second conductor, such that the P-sensor module can be arranged without directly connecting to the signal feeding wire and the grounding wire, thereby preventing an interference between a detecting signal and a RF signal from occurring to influence a detecting function and a radiating function of the P-sensor antenna device.

In order to further appreciate the characteristics and technical contents of the instant invention, references are hereunder made to the detailed descriptions and appended drawings in connection with the instant invention. However, the appended drawings are merely shown for exemplary purposes, rather than being used to restrict the scope of the instant invention.

DETAILED DESCRIPTION OF THE PREFERRED EMBODIMENTS

Figure 1:
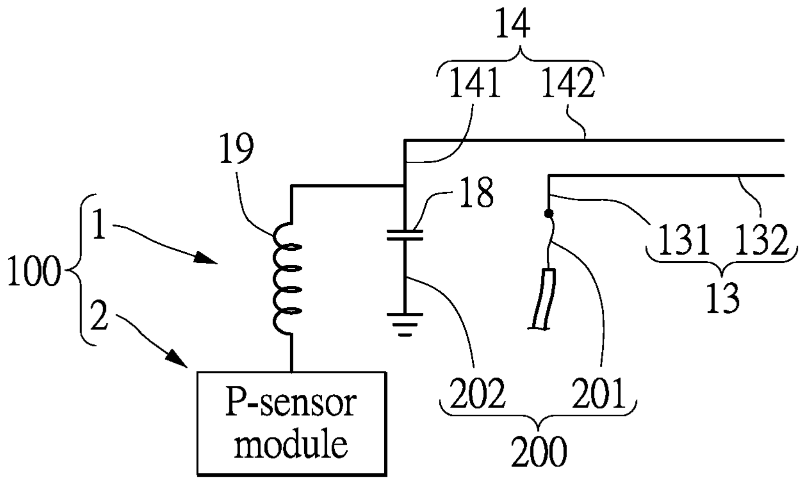
FIG. 1 is a perspective view showing a proximity sensor antenna device according to the instant disclosure.
Figure 2:
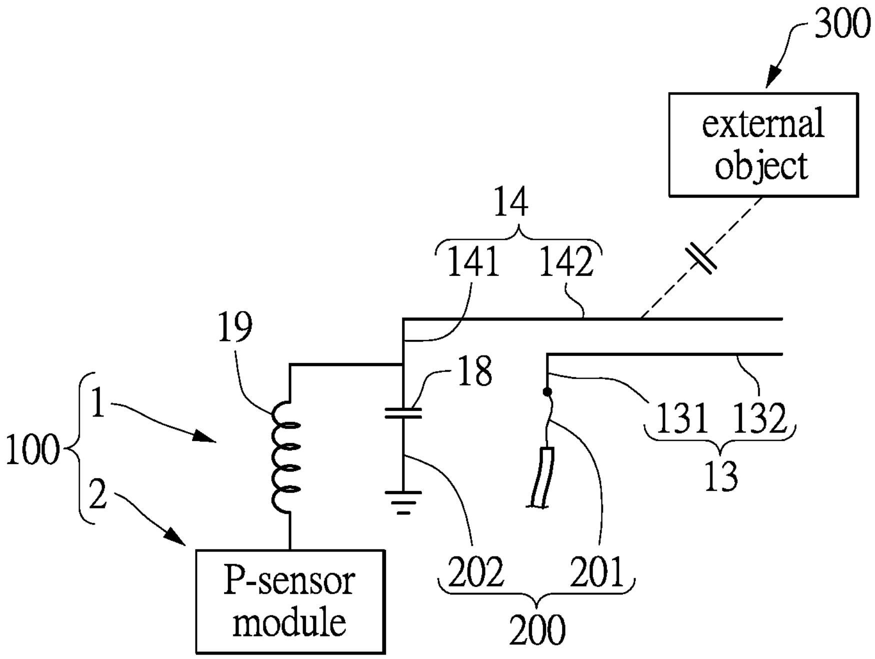
FIG. 2 is an operating view of FIG. 1.

Please refer to FIGS. 1 and 2, which show an embodiment of the instant disclosure. References are hereunder made to the detailed descriptions and appended drawings in connection with the instant invention. However, the appended drawings are merely shown for exemplary purposes, rather than being used to restrict the scope of the instant invention.

The instant embodiment provides a proximity sensor antenna device (P-sensor antenna device) 100 for installing in an electronic apparatus (not shown), and the P-sensor antenna device 100 is provided to cooperate with a transmission circuit 200 of the electronic apparatus. The electronic apparatus can be a notebook computer, a tablet computer, a global positioning system (GPS) apparatus, a hand-held electronic device (i.e., smart phone), or a wearable apparatus (i.e., smart watch). The transmission circuit 200 in the instant embodiment includes a signal feeding wire 201 and a grounding wire 202.

The P-sensor antenna device 100 includes an antenna structure 1 and a proximity sensor module (P-sensor module) 2 electrically connected to the antenna structure 1. The antenna structure 1 has a first conductor 13, a second conductor 14, a capacitance member 18, and an inductance member 19. The first conductor 13 and the second conductor 14 are in a coplanar arrangement and are separated from each other.

Specifically, the first conductor 13 has a feeding segment 131 for receiving signal and a radiating segment 132 connected to the feeding segment 131. The second conductor 14 has a grounding segment 141 for electrically connecting to ground and a detecting segment 142 connected to the grounding segment 141. The feeding segment 131 of the first conductor 13 is configured to connect (e.g., electrically connect) to the signal feeding wire 201 of the transmission circuit 200, and the grounding segment 141 of the second conductor 14 is configured to connect (e.g., electrically connect) to the grounding wire 202 of the transmission circuit 200. Moreover, the detecting segment 142 is configured to couple with the radiating segment 132 through a radiofrequency signal (i.e., the detecting segment 142 is in a coupling antenna mode), and the detecting segment 142 is also configured to be a capacitance electrode for detecting an external object (e.g., person) 300 (i.e., the detecting segment 142 is in a capacitance electrode mode). When the detecting segment 142 is in the capacitance electrode mode, a capacitance value between the detecting segment 142 and an external object 300 is variable according to a distance between the detecting segment 142 and the external object 300.

The capacitance member 18 is electrically connected to the grounding segment 141 of the second conductor 14, such that the capacitance member 18 is configured to prevent a detecting signal traveling in the detecting segment 142 from flowing into the grounding segment 142 when the detecting segment 142 is in the capacitance electrode mode, thus a short-circuit problem can be avoided. The inductance member 19 is electrically connected to the grounding segment 141 of the second conductor 14, such that the inductance member 19 is configured to prevent a radiofrequency signal (i.e., RF signal) traveling in the detecting segment 142 from flowing into the P-sensor module 2 when the detecting segment 142 is in the coupling antenna mode. Moreover, the P-sensor module 2 is electrically connected to the inductance member 19, and the P-sensor module 2 is electrically connected to the second conductor 14 via the inductance member 19.

Specifically, when a detecting signal travels in the detecting segment 142 of the antenna structure 1, the capacitance member 18 has a high impedance (such as an open-circuit) and the inductance member 19 has a low impedance (such as a short-circuit), thus the detecting segment 142 can be used as a capacitance electrode of the P-sensor module 2. When a RF signal emitted from the radiating segment 132 travels in the detecting segment 142 of the antenna structure 1, the capacitance member 18 has a low impedance (such as a short-circuit) and the inductance member 19 has a high impedance (such as an open-circuit), thus the inductance member 19 can be used to effectively isolate the P-sensor module 2 from the RF signal traveling in the detecting segment 142, and the first conductor 13 and the second conductor 14 are coupled through the RF signal so as to construct a mono-pole antenna.

In other words, when the P-sensor module 2 emits a detecting signal into the inductance member 19, the inductance member 19 is in a short-circuit mode for providing a traveling path of the detecting signal, and the capacitance member 18 is in an open-circuit mode for guiding the detecting signal to flow into the detecting segment 142 of the second conductor 14. When the first conductor 13 and the second conductor 14 are coupled through a RF signal and the RF signal flows into the inductance member 19, the inductance member 19 is in an open-circuit mode for preventing the RF signal from flowing into the P-sensor module 2, and the capacitance member 18 is in a short-circuit mode for providing a traveling path of the RF signal.

Thus, when an external object 300 is far from the antenna structure 1, an electronic apparatus (not shown) including the P-sensor antenna device 100 of the instant disclosure has a RF transmission function. When an external object 300 is close to the antenna structure 1, a capacitance value between the detecting segment 142 of the antenna structure 1 and the external object 300 is increased causing the P-sensor module 2 to emit a corresponding signal to the electronic apparatus so as to reduce an intensity of a near field electromagnetic radiation. Thus, the radiation of RF signal (e.g., Specific Absorption Rate) generated by the electronic apparatus can satisfy a standard of each country if a user closely operates the electronic apparatus.

The main conditions of the P-sensor antenna device 100 of the instant disclosure have been disclosed in the above description, and the following description discloses the antenna structure 1 of the instant disclosure in a specific embodiment, but the antenna structure 1 is not limited thereto.

Figure 3:
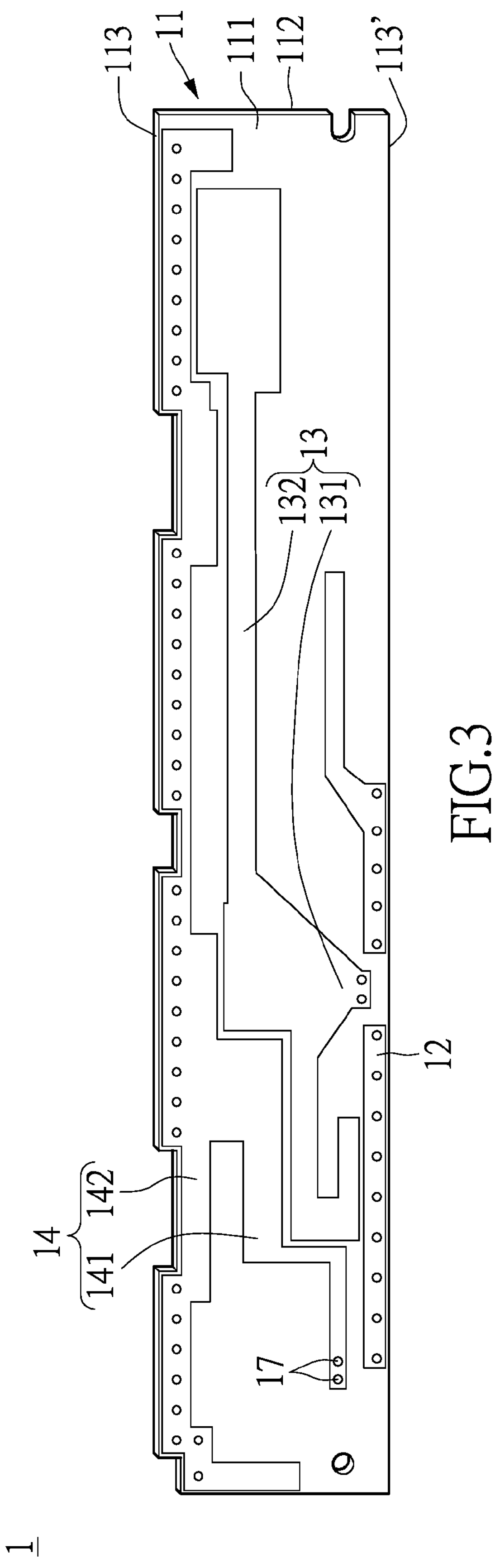
FIG. 3 is a perspective view of FIG. 1 according to an embodiment.
Figure 4:
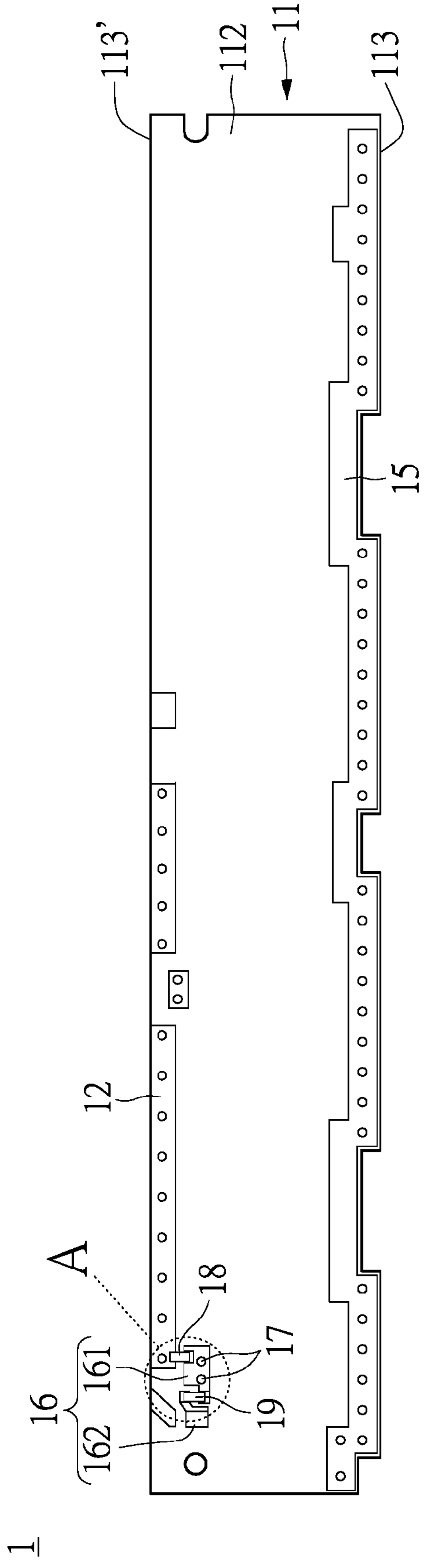
FIG. 4 is a perspective view of FIG. 3 from another perspective.
Figure 5:
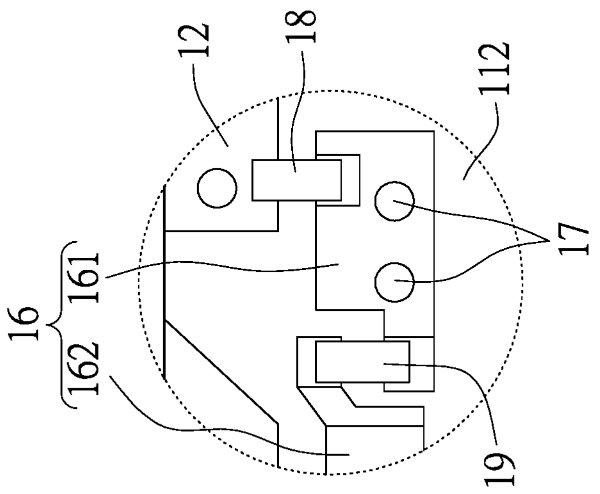
FIG. 5 is an enlarged view showing the portion A of FIG. 3.

As shown in FIGS. 3 through 5, the antenna structure 1 further includes an insulating substrate 11, two grounding sheets 12, a third conductor 15, a soldering assembly 16, and two conducting pillars 17. The insulating substrate 11 is approximately a rectangular plate, and the insulating substrate 11 has a first surface 111, a second surface 112 opposing to the first surface 111, a wave-shaped long edge 113, and a straight-shaped long edge 113' opposing to the wave-shaped long edge 113. The wave-shaped long edge 113 in the instant embodiment means a long edge of the rectangular insulating substrate 11 having a plurality of notches (not labeled) concavely formed thereon.

The two grounding sheets 12 are respectively disposed on the first surface 111 and the second surface 112 of the insulating substrate 11, and the two grounding sheets 12 are arranged adjacent to the straight-shaped long edge 113'. The two grounding sheets 12 can be electrically connected to each other, but are not limited thereto.

The first conductor 13 and the second conductor 14 are disposed on the first surface 111 of the insulating substrate 11 and are in a coplanar arrangement. The first conductor 13 is arranged between the second conductor 14 and the straight-shaped long edge 113'. The detecting segment 142 of the second conductor 14 is arranged along the wave-shaped long edge 113, that is to say, the edge of the detecting segment 142 in the instant embodiment is similar to the wave-shaped long edge 113 so as to construct the wave-shaped detecting segment 142. Moreover, the third conductor 15 is disposed on the second surface 112 of the insulating substrate 11 and is connected to the second conductor 14. The third conductor 15 is approximately arranged in a region, which is defined by orthogonally projecting the detecting segment 142 onto the second surface 112 of the insulating substrate 11. Specifically, the third conductor 15 is arranged along the wave-shaped long edge 113, and the edge of the third conductor 15 in the instant embodiment is similar to the wave-shaped long edge 113 so as to construct the wave-shaped third conductor 15. The shape of the third conductor 15 in the instant embodiment is similar to that of the detecting segment 142, but is not limited thereto.

The soldering pad assembly 16 has a connecting pad 161 and an external connection pad 162. The connecting pad 161 and the external connection pad 162 are disposed on the second surface 112 of the insulating substrate 11. The position of the connecting pad 161 is aligned with the grounding segment 141 of the second conductor 14 and is adjacent to the grounding sheet 12 disposed on the second surface 112. That is to say, the connecting pad 161 is approximately arranged in a region, which is defined by orthogonally projecting the grounding segment 141 onto the second surface 112 of the insulating substrate 11. The external connection pad 162 is arranged close to the connecting pad 161 for providing an electrical connection of the P-sensor module 2. Specifically, the signal feeding wire 201 connected to the P-sensor module 2 is soldered on the external connection pad 162, such that the P-sensor module 2 is electrically connected to the inductance member 19 via the external connection pad 162.

The two conducting pillars 17 are embedded in the insulating substrate 11, and two opposite ends of each conducting pillar 17 are respectively connected to the connecting pad 161 and the grounding segment 141 of the second conductor 14. In other words, the connecting pad 161 is electrically connected to the second conductor 14 via the conducting pillars 17.

The capacitance member 18 is soldered on the connecting pad 161 and the grounding sheet 12 disposed on the second surface 112, so the capacitance member 18 can establish an electrical connection between the second conductor 14 (or the connecting pad 161) and the grounding sheet 12 disposed on the second surface 112. The inductance member 19 is soldered on the connecting pad 161 and the external connection pad 162, so the inductance member 19 can establish an electrical connection between the second conductor 14 (or the connecting pad 161) and the external connection pad 162 causing the second conductor 14 to electrically connect to the P-sensor module 2.

THE POSSIBLE EFFECT OF THE INSTANT DISCLOSURE

In summary, the P-sensor antenna device and the antenna structure in the instant disclosure are provided to reduce volume and cost by having the above component arrangement and using the second conductor to selectively be a radiator and a capacitance electrode. Moreover, the first and second conductors are in a coplanar arrangement and are separated from each other, and the capacitance member and the inductance member are electrically connected to the second conductor, such that the P-sensor module can be arranged without directly connecting to the signal feeding wire and the grounding wire, thereby preventing an interference between a detecting signal and a RF signal from occurring to influence a detecting function and a radiating function of the P-sensor antenna device.

The descriptions illustrated supra set forth simply the preferred embodiments of the instant invention; however, the characteristics of the instant invention are by no means restricted thereto. All changes, alterations, or modifications conveniently considered by those skilled in the art are deemed to be encompassed within the scope of the instant invention delineated by the following claims.

What is claimed is:

1. A proximity sensor antenna device, comprising:

an antenna structure, comprising:

a first conductor having a feeding segment for receiving a signal and a radiating segment connected to the feeding segment;

a second conductor having a grounding segment for electrically connecting to a ground and a detecting segment connected to the grounding segment, wherein the second conductor and the first conductor are in a coplanar arrangement and are separated from each other, wherein the detecting segment is selectively in a coupling antenna mode and in a capacitance electrode mode; when the detecting segment is in the coupling antenna mode, the detecting segment is configured to couple with the radiating segment through a radiofrequency signal; when the detecting segment is in the capacitance electrode mode, the detecting segment is configured to detect an external object, and a capacitance value between the detecting segment and the external object is variable according to a distance between the detecting segment and the external object;

an insulating substrate having a first surface and an opposite second surface, wherein the first conductor and the second conductor are disposed on the first surface of the insulating substrate;

a capacitance member electrically connected to the grounding segment of the second conductor, wherein the capacitance member is configured to block a detecting signal traveling in the detecting segment when the detecting segment is in the capacitance electrode mode;

an inductance member electrically connected to the second conductor, wherein the inductance member is configured to block a radiofrequency signal traveling in the detecting segment when the detecting segment is in the coupling antenna mode; and a connecting pad and a conducting pillar, wherein the connecting pad is disposed on the second surface of the insulating substrate, the position of the connecting pad corresponds to the grounding segment of the second conductor, the conducting pillar is embedded in the insulating substrate, two opposite ends of the conducting pillar are respectively connected to the connecting pad and the grounding segment of the second conductor, and the capacitance member and the inductance member are soldered on the connecting pad; and a proximity sensor module electrically connected to the inductance member and electrically connected to the second conductor via the inductance member, wherein when the proximity sensor module emits a detecting signal into the inductance member, the inductance member is in a short-circuit mode for providing a traveling path of the detecting signal, and the capacitance member is in an open-circuit mode for guiding the detecting signal to flow into the detecting segment of the second conductor, wherein when the first conductor and the second conductor are coupled through a radiofrequency signal and the radiofrequency signal flows into the inductance member, the inductance member is in an open-circuit mode for preventing the radiofrequency signal from flowing into the proximity sensor module, and the capacitance member is in a short-circuit mode for providing a traveling path of the radiofrequency signal.

2. The proximity sensor antenna device as claimed in claim 1, wherein the antenna structure comprises a third conductor disposed on the second surface of the insulating substrate, the third conductor is arranged in a region defined by orthogonally projecting the detecting segment onto the second surface of the insulating substrate.

3. The proximity sensor antenna device as claimed in claim 2, wherein the third conductor is connected to the second conductor.

4. The proximity sensor antenna device as claimed in claim 1, wherein the antenna structure comprises a grounding sheet and an external connection pad, the grounding sheet and the external connection pad are disposed on the second surface of the insulating substrate, the external connection pad is arranged adjacent to the connecting pad, the proximity sensor module is electrically connected to the external connection pad, the capacitance member is soldered on the connecting pad and the grounding sheet, the inductance member is soldered on the connecting pad and the external connection pad.

5. An antenna structure of a proximity sensor antenna device, comprising:

a first conductor having a feeding segment for receiving a signal and a radiating segment connected to the feeding segment;

a second conductor having a grounding segment for electrically connecting to a ground and a detecting segment connected to the grounding segment, wherein the second conductor and the first conductor are in a coplanar arrangement and are separated from each other, wherein the detecting segment is selectively in a coupling antenna mode and in a capacitance electrode mode; when the detecting segment is in the coupling antenna mode, the detecting segment is configured to couple with the radiating segment through a radiofrequency signal; when the detecting segment is in the capacitance electrode mode, the detecting segment is configured to detect an external object, and a capacitance value between the detecting segment and the external object is variable according to a distance between the detecting segment and the external object;

an insulating substrate having a first surface and an opposite second surface, wherein the first conductor and the second conductor are disposed on the first surface of the insulating substrate;

a capacitance member electrically connected to the grounding segment of the second conductor, wherein the capacitance member is configured to block a detecting signal traveling in the detecting segment when the detecting segment is in the capacitance electrode mode;

an inductance member electrically connected to the second conductor, wherein the inductance member is configured to block a radiofrequency signal traveling in the detecting segment when the detecting segment is in the coupling antenna mode; and a connecting pad and a conducting pillar, wherein the connecting pad is disposed on the second surface of the insulating substrate, the position of the connecting pad corresponds to the grounding segment of the second conductor, the conducting pillar is embedded in the insulating substrate, two opposite ends of the conducting pillar are respectively connected to the connecting pad and the grounding segment of the second conductor, and the capacitance member and the inductance member are soldered on the connecting pad.

6. The antenna structure of the proximity sensor antenna device as claimed in claim 5, further comprising a third conductor disposed on the second surface of the insulating substrate, wherein the third conductor is arranged in a region defined by orthogonally projecting the detecting segment onto the second surface of the insulating substrate, wherein the third conductor is connected to the second conductor.

* * * * *